United States Patent [19]

Kawamata et al.

[11] Patent Number: 5,549,955
[45] Date of Patent: Aug. 27, 1996

[54] MAGNETIC RECORDING DISK

[75] Inventors: Toshio Kawamata; Satoru Hayakawa; Yasushi Endo, all of Kanagawa, Japan

[73] Assignee: Fuji Photo Film Co., Ltd., Kanagawa, Japan

[21] Appl. No.: 419,757

[22] Filed: Apr. 10, 1995

Related U.S. Application Data

[63] Continuation of Ser. No. 44,384, Apr. 2, 1993, abandoned.

[30] Foreign Application Priority Data

Apr. 2, 1992 [JP] Japan .................................. 4-108478

[51] Int. Cl.$^6$ ................................................ G11B 5/66
[52] U.S. Cl. ............ 428/65.3; 428/694 B; 428/694 BS; 428/694 BK; 428/694 BN; 428/336; 428/900
[58] Field of Search .................. 428/694 B, 694 BS, 428/694 BR, 694 BN, 65, 900, 336, 65.3

[56] References Cited

U.S. PATENT DOCUMENTS

| | | | |
|---|---|---|---|
| 4,425,401 | 1/1984 | Ido et al. ............................... | 428/329 |
| 4,746,558 | 5/1988 | Shimozawa et al. ................... | 428/141 |
| 4,788,092 | 11/1988 | Chubachi et al. ..................... | 428/65.3 |
| 4,895,758 | 1/1990 | Sakemoto et al. ...................... | 428/323 |
| 4,975,322 | 12/1990 | Hideyama et al. ..................... | 428/323 |
| 5,079,096 | 1/1992 | Miyake et al. ......................... | 428/500 |
| 5,151,323 | 9/1992 | Kawahara .............................. | 428/323 |

*Primary Examiner*—Leszek Kiliman
*Attorney, Agent, or Firm*—Sughrue, Mion, Zinn, Macpeak & Seas

[57] ABSTRACT

A magnetic recording disk having a good overwriting characteristic and an excellent electromagnetic characteristic, as well as superior running durability. The magnetic recording disk comprises a non-magnetic support having coated thereon, in the order, a non-magnetic layer comprising mainly a non-magnetic powder and a binder resin and a magnetic layer comprising mainly a ferromagnetic powder and a binder resin, wherein the magnetic layer is formed by applying a magnetic layer coating solution onto the coated non-magnetic layer while the non-magnetic layer remains in a wet condition, the average thickness of the magnetic layer is 0.5 μm or less, and the maximum thickness and the minimum thickness thereof fall within the range of ±15% of the average thickness of the magnetic layer.

6 Claims, No Drawings

MAGNETIC RECORDING DISK

This is a continuation of application Ser. No. 08/044,384 filed Apr. 2, 1993, now abandoned.

FIELD OF THE INVENTION

The present invention relates to a magnetic recording disk for high density recording, and specifically to a magnetic recording disk for digital data recording.

BACKGROUND OF THE INVENTION

A magnetic recording technique has a number of excellent characteristics which are not provided by other recording systems, such as the ability to repeatedly use the recording medium, ease of conversion of input data to an electronic signal, the ability to combine the recording technique with relevant equipment to form a system, and the ability to readily process a signal. Accordingly, magnetic recording techniques have been extensively applied to various fields such as the video, audio and computer fields. In order to meet the demand for miniaturization of equipment, enhancement of a recorded and reproduced signal, the trend to longer recording, and an increase in recording capacity, further improvement in recording density is needed. For a coating type magnetic recording disk, various means have been proposed in which the particle size of a ferromagnetic powder is decreased, the dispersibility thereof is improved and the packing density in a magnetic layer is increased. As further effective means, a ferromagnetic metal powder and hexagonal ferrite having excellent electromagnetic characteristics have been used.

The widespread use of OA equipment (i.e., Office Automation Equipment) such as a minicomputer and a personal computer has been accompanied by a marked increase in the popularity and use of a magnetic recording disk. A magnetic recording disk is used and stored under broad environmental conditions of temperature and humidity and in dusty environments. In particular, an improvement in recording density is strongly desired in order to achieve a large data recording capacity and miniaturization of the recording disk. In order to obtain a magnetic recording disk suitable for high density recording with an acicular ferromagnetic powder as in the past, it was necessary to employ a maximum size of the acicular ferromagentic powder sufficiently smaller than the recording wavelength or a record bit length. At present, an acicular ferromagnetic powder having a size of 0.3 µm has already been brought into practical use, which makes it possible to record at wavelengths of 1 µm or less.

It is necessary to further reduce the size of the acicular ferromagnetic powder in order to obtain a medium which enables even higher density recording. However, such a small-sized acicular ferromagnetic powder is disadvantageous in that the thickness thereof, which is 100 Å or less, is very fine and the particle volume thereof, which is about $10^{-17}$ cm$^3$, is very small. Consequently, the electromagnetic characteristics thereof are reduced by thermal disturbance and surface effects so that sufficient orientation cannot be obtained by applying a magnetic field to a coated magnetic layer.

In recent years, a high recording density magnetic recording medium has been developed based on a hexagonal series ferrite grain which is tabular and has an axis of easy magnetization perpendicular to a plate as a ferromagnetic powder as described, for example, in U.S. Pat. No. 4,425,401 corresponding to JP-A-58-6525 (the term "JP-A" as used herein means an unexamined published Japanese patent application) and JP-A-58-6526. This ferromagnetic powder allows for an average particle size of 0.05 µm and high density recording.

Furthermore, a narrow track width is required for high density recording. In order to satisfy these requirements, the development and application in a magnetic disk of a ferromagnetic metal powder and a ferromagnetic hexagonal series ferrite for size miniaturization and improvement in recording density have been intensively investigated. In particular, the shift towards a thinner magnetic layer and high output are desired for achieving a high recording density and an improved overwriting electro-magnetic characteristic. However, there is a concern that the shift towards a thinner magnetic layer might be accompanied by a extreme deterioration of running durability.

An overwrite of the recording signals with different magnetic wavelengths is usually necessary in a magnetic recording disk for a computer such as a floppy disk. It was sufficient in the past to carry out the overwrite of two kinds of signals 1f and 2f which are in a relationship of two times in terms of frequency. However, not only a shorter recording wavelength but also the overwrite of plural RLL signals with a frequency ratio of 3:8 present at a broader range, are required for a magnetic recording disk with a high capacity of 10M bites, in which high capacity has been strongly desired in recent years. Where a signal having a short recording wavelength and a large difference in recording frequency is used, the improvement in electro-magnetic characteristics of a magnetic layer was the only limiting factor for successfully overwriting a signal with a short recording wavelength on a signal with a long recording wavelength as disclosed in U.S. Pat. No. 4,788,092 corresponding to JP-A-58-122623 and U.S. Pat. No. 4,895,758 corresponding to JP-A-61-74137.

In a conventional magnetic layer with a thickness of 1.0 µm or more, overwrite of a signal with a shorter wave-length on a formerly recorded signal with a longer wavelength cannot erase the formerly recorded signal since a line of magnetic force cannot reach through the entire depth of the magnetic layer.

Furthermore, an improvement in recording density is accompanied by a narrower gap between the recording heads, which causes difficulty in sufficiently recording in the thickness direction of medium.

In order to solve the above problem, a thin magnetic layer of 1 µm or less was proposed. However, the thin magnetic layer was liable to peel off and good running durability (a main factor for preventing dropout) could not be obtained, thus deteriorating reliability.

Accordingly, in developing a magnetic recording disk having the desired high density recording, improvement in reproducing output, securing an overwriting characteristic and running durability, in particular, have become obstacles.

Electrification in running of a magnetic recording disk increases the number of dropouts attributable to adherence of dust and the error rate thereby has become a fatal defect. In order to solve this electrification problem, methods are employed in which an additive is added in order to prevent electrification in a magnetic layer. Among them, the method in which carbon black is added is the most effective and broadly applied. However, in the above magnetic recording disk for high density recording, the addition of carbon black lowers the packing degree of a magnetic substance to deteriorate the output. Therefore, the addition amount of the carbon black is limited, so that the antistatic effect is insufficient.

In particular, the above described ferromagnetic hexagonal series ferrite powder has a low saturation magnetization as compared with those of a Co—$Fe_2O_3$ ferromagnetic powder and a ferromagnetic metal powder. Consequently, it is difficult to obtain high output, and therefore the packing density of the ferromagnetic hexagonal series ferrite powder has to be increased in order to provide a magnetic recording disk with high output. However, since the hexagonal series ferrite powder is of a fine particle and is in the form of hexagon, the dispersibility thereof is inferior as compared with that of a conventional ferromagnetic powder. Thus, it is substantially difficult to obtain both good antistatic properties and high reproducing output.

Various proposals for preventing electrification and providing high output and improved durability are disclosed in JP-A-55-55431, JP-A-55-55432, JP-A-55-55433, JP-A-55-55434, JP-A-60-164926, JP-A-55-55436, JP-A-62-38523, and JP-A- 62-159337.

Namely, an intermediate layer is provided between a magnetic layer and a support, wherein the intermediate layer containing carbon black and a binder resin is coated and then the magnetic layer is formed thereon.

Although effective for improving running durability, the electromagnetic characteristic of this method, namely, high reproducing output and an overwriting characteristic, is inadequate for high density recording in a magnetic recording disk.

The following additional difficulties have been encountered with conventional coating techniques when an extremely thin magnetic layer is coated, for example 0.5 μm or less, in order to improve the overwriting characteristic:

(1) It is difficult to directly carry out coating on a non-magnetic support in an even thickness and the coated magnetic layer tends to peel off, and (2) The coating can be carried out on an intermediate layer (a non-magnetic layer) provided as a lower layer, but subsequent coating causes a loss of adhesion which in turn results in dropout due to peeling of the magnetic layer.

The investigations resulted in the finding that application of the wet-on-wet coating method (described in U.S. Pat. No. 4,844,946) in which a non-magnetic layer and a magnetic layer are simultaneously coated while they are in a wet condition is effective for solving the above problems.

However, application of this wet-on-wet coating method above could not sufficiently solve the following additional problem.

When a non-magnetic layer is provided, selection of a dispersing solvent for the magnetic layer is important. If the same kind of solvent is used for both the magnetic layer and the non-magnetic layer, the solvent used in coating the magnetic layer dissolves the non-magnetic layer when the magnetic layer is coated on the non-magnetic layer. The boundary between the non-magnetic layer and the magnetic layer is disturbed, which results in considerable variation in thickness of the magnetic layer. On the other hand, use of a solvent which does not dissolve the non-magnetic layer for coating the magnetic layer limits the above binder resins for use in the magnetic layer to a large extent. Additionally, coating with such solvents markedly deteriorates the adhesive force between the non-magnetic layer and the magnetic layer to thereby considerably reduce durability.

Namely, a non-magnetic layer coating solution and a magnetic layer coating solution are coated on a non-magnetic support in a wet condition. Therefore, the boundary between the non-magnetic layer and magnetic layer is disturbed, so that the thickness of the magnetic layer tends to vary. The generation of a portion at which the magnetic layer becomes thicker deteriorates the overwrite characteristic at that portion. Consequently, a previously recorded signal cannot be removed, so that there is a concern as to the ability to carry out reproduction. On the other hand, efforts to control the thickness variation in the magnetic layer make it difficult to obtain good durability.

Accordingly, efforts to minimize the thickness of the magnetic layer with conventional coating techniques to improve the overwrting characteristic results in increased thickness variation. This in turn makes it difficult to obtain a magnetic recording disk having a thin magnetic layer which has good overwriting characteristics over all tracks suitable for digital recording and high reproduction output, and which excels in running durability.

An effective method for solving these problems has not hitherto been proposed.

SUMMARY OF THE INVENTION

An object of the present invention, in consideration of the above described problems using conventional techniques, is to provide a high density magnetic recording disk having good overwriting characteristics over all tracks thereof as well as good electromagnetic characteristics including reproduction output, which magnetic recording disk further exhibits excellent running durability.

The above object is achieved by providing a magnetic recording disk comprising a non-magnetic support having coated thereon, in the order, a non-magnetic layer comprising mainly a non-magnetic powder and a binder resin and a magnetic layer comprising mainly a ferromagnetic powder and a binder resin, wherein the magnetic layer is formed by applying a magnetic layer coating solution onto the coated non-magnetic layer while the non-magnetic layer remains in a wet condition, the average thickness of the magnetic layer is 0.5 μm or less, and the maximum thickness and the minimum thickness of the magnetic layer fall within the range of ±15% of the average thickness of the magnetic layer.

DETAILED DESCRIPTION OF THE INVENTION

The magnetic recording disk of the present invention comprises a non-magnetic support having coated thereon a non-magnetic layer and a magnetic layer in this order, and is further characterized in that the average thickness of the magnetic layer is controlled to 0.5 μm or less and the maximum thickness ($T_{max}$) and the minimum thickness ($T_{min}$) thereof fall within the range of ±15% of the average thickness of the magnetic layer.

The present inventors discovered that at least the thickness of the magnetic layer and the variation thereof each falling within the above ranges stably provides excellent electromagnetic characteristics such as an overwriting characteristic and reproduction output over all of the tracks of a magnetic recording disk.

The average thickness ($T_0$) of the magnetic layer is calculated in the following manner:

The magnetic recording disk is cut to a thickness of 0.1 μm with an ultramicrotome using a diamond cutter, and an intercept of a section thereof is photographed by 5,000 to 10,000 magnification with a transmittance type electron microscope to prepare prints of A4 to A5 size (e.g., 8.7 cm×10.7 cm). Then, the interface between the non-magnetic layer and magnetic layer is fringed with a black color by visually observing the difference in the shapes of the ferromagnetic powder and the non-magnetic powder. The surface of the magnetic layer is similarly fringed and the distance between the fringed lines is measured with a picture processing apparatus IBAS2 manufactured by Zeiss Co., Ltd. In a measured portion, the distance ($T_1$) between a peak of a mountain formed by the above fringed interface between the magnetic layer and non-magnetic layer and the surface of the magnetic layer, and the distance ($T_2$) between a bottom of the valley formed by the interface and the surface of the magnetic layer in a length of 20 μm (an actual length) are each measured each at five portions, and an average value of the sum thereof is given as the average thickness.

In the present invention, the maximum thickness ($T_{max}$) means the maximum measurement value of $T_2$ and the minimum thickness ($T_{min}$) similarly means the minimum measurement value of $T_1$.

In the present invention, the thickness of the magnetic layer is controlled so that all of the following equations are satisfied:

$$\Delta T_{max}=100\times(T_{max}-T_0)/T_0 \leq 15 \; (\%) \quad (a)$$

$$\Delta T_{min}=100\times(T_{min}-T_0)/T_0 \geq -15 \; (\%) \quad (b)$$

$$\Delta T_{max}-\Delta T_{min}=100\times(\Delta T_{max}-\Delta T_{min})/T_0 \leq 30 \; (\%) \quad (c)$$

If the value exceeds 15% in equation (a), or the value is less than −15% in equation (b) or the value exceeds 30% in equation (c), the electromagnetic characteristics such as the overwriting characteristic and reproduction output are not satisfied.

In the most preferable embodiment of the present invention, the fringe curve forming the interface in the magnetic layer is ideally a constant linear line (in equations (a), (b) and (c), the left side approaches 0). Actually, a smooth curve similar to a sine curve is formed having a small amplitude as compared with a curve in a conventional magnetic recording disk with $T_0$ set as an axis. The above equations (a) and (c) are thereby satisfied, so that the thickness variation is controlled to the extent possible.

In equation (a), $\Delta T_{max}$ is controlled preferably in the range of $0 \leq \Delta T_{max} \leq 12$ (%), particularly preferably $0 \leq \Delta T_{max} \leq 8$ (%). In equation (b), $\Delta T_{min}$ is controlled preferably in the range of $-12 \leq \Delta T_{min} \leq 0$ (%), particularly preferably $-8 \leq \Delta T_{min} \leq 0(\%)$.

In the present invention, a longer interval between a mountain and a valley at the interface fringe curve is preferable. The interval between the mountains or the valleys is preferably constant to the extent possible.

A magnetic recording disk of the present invention meeting the values specified in the above ranges exhibits markedly improved electromagnetic characteristics such as reproduction output and an overwriting characteristic.

The present inventors found that a wet-on-wet coating method is effective as a coating method for forming a magnetic layer and a non-magnetic layer resistant to peeling of the magnetic layer, to thereby obtain a high durability magnetic recording disk.

In a method in which a non-magnetic layer is provided on a support and then a magnetic layer is further provided thereon after drying with a conventional blade coating method and gravure coating method, the adhesive force between the non-magnetic layer and magnetic layer is insufficient. Accordingly, in forming an ultra thin magnetic layer such as that employed in the present invention, the durability is inferior and the resulting magnetic disk is not practically useful.

In the present invention, the above equations can be satisfied by applying the wet-on-wet coating method. Furthermore, the non-magnetic layer and the magnetic layer is unified by applying the wet-on-wet coating method to increase the adhesive force between the non-magnetic layer and the magnetic layer.

The following are given as useful examples of the wet-on-wet coating method for use in the present invention.

1. A method in which a non-magnetic layer is first coated with a gravure coating, roll coating, blade coating or extrusion coating equipment and then while in a wet condition, a magnetic layer is coated with the non-magnetic support pressure type extrusion coating equipment disclosed, for example, in JP-B-1-46186 (the term "JP-B" as used herewith means an examined Japanese patent publication), and JP-A-60-238179 and JP-A-2-265672;

2. A method in which a non-magnetic layer coating solution and a magnetic layer coating solution are simultaneously coated with a head having two built-in slits for extruding a coating solution as disclosed in JP-A-63-88080, JP-A-2-17971 and JP-A-2-265672; and 3. A method in which a non-magnetic layer coating solution and a magnetic layer coating solution are almost simultaneously coated with extrusion coating equipment having a backup roll, as disclosed in JP-A-2-174965.

In the manufacturing method according to the present invention, a method is provided in which the thickness variation of the magnetic layer is controlled and the thickness accuracy is improved in the wet-on-wet coating method. The following five means are given as useful examples thereof.

A first means is to appropriately select the solvents used for the non-magnetic layer coating solution and the magnetic layer coating solution. The selection criterion is that the boiling point of the solvent used for the non-magnetic layer coating solution is higher than the boiling point of the solvent used for the magnetic layer coating solution.

Briefly describing the action and effect thereof, vaporization of the solvent from the formerly coated non-magnetic layer in a wet condition can thereby be controlled to restrain configurational change and deformation of the non-magnetic layer on the surface thereof, and to suppress the disturbance of the solutions at the interface upon contact with the magnetic layer coating solution having a different viscoelastic characteristic. Consequently, the thickness of the magnetic layer formed on the non-magnetic layer can be made more uniform, that is, the thickness variation can be controlled to smaller excursions.

The boiling point of the solvent used for the non-magnetic magnetic layer is generally 90° C. or more, preferably 100° C. or more and the boiling point of the solvent used for the magnetic layer is preferably 100° C. or less, more preferably 80° C. or less. The difference in the boiling points of the solvents used for the non-magnetic layer and magnetic layer is preferably 40° C. or more, more preferably 50° C. to 100° C., so that the thickness of the magnetic layer can be controlled within the specified range of the present invention.

Useful examples of solvents for the non-magnetic layer coating solution of the present invention having a boiling point of 90° C. or more include ketones such as cyclohexanone (boiling point: 156° C.), methyl isobutyl ketone (boiling point: 116° C.), and diisobutyl ketone (boiling point: 168° C.), alcohols such as isophorone (boiling point:

215° C.), butanol (boiling point: 118° C.), and isobutyl alcohol (boiling point: 108° C.), and 2-methylcyclohexanol (boiling point: 173° C.). The solvents can be used singly or in a mixture thereof. Preferred for the non-magnetic layer coating solution is a solvent having excellent compatibility with the binder resin for the non-magnetic layer and a lubricant added thereto, such as, for example, cyclohexanone.

The boiling point of the solvent for the magnetic layer coating solution coated on the non-magnetic layer is lower than the boiling point of the solvent for the non-magnetic layer coating solution. Useful examples thereof include, for example, methyl ethyl ketone (boiling point: 79° C.), THF (boiling point: 66° C.), acetone (boiling point: 56° C.), propanol (boiling point: 97° C.), methyl acetate (boiling point: 58° C.), benzene (boiling point: 80° C.), hexane (boiling point: 69° C.), and carbon tetrachloride (boiling point: 77° C.). The solvents can be used singly or in a mixture thereof. Where the solvent for the non-magnetic or magnetic coating solution is a mixed solvent, a virtual boiling point thereof can be additively calculated from a weight ratio of the solvents used.

A second means is to regulate the drying process at the drying step after coating the layers on a non-magnetic support by the wet-on-wet coating method. That is, the drying step is carried out after magnetic orientation as needed following provision of a non-magnetic layer and a magnetic layer on the non-magnetic support. The drying is carried out by gradually raising the temperature from room temperature to restrain thickness variation in the magnetic layer at the drying step for the non-magnetic layer and magnetic layer.

Examples thereof include the method in which a coated magnetic recording disk is passed through at an ambient temperature changing from room temperature to a higher temperature, preferably 20° to 150° C., particularly preferably 25° to 120° C. The method for changing the ambient temperature is not particularly limited and may be continuous or discontinuous. The rate for increasing the temperature is controlled preferably at 0.6° to 4° C./second.

More specific examples thereof include the method in which a web, after carrying out the wet-on-wet coating, is passed through a drying chamber with the constant temperature in which the ambient temperature of the drying chamber is discontinuously increased in the running direction of the web while transporting the web at a constant speed. For example, the method is given in which the transporting speed of the web is set at 50 to 300 m/minute to carry out drying at 25° C., 40° C., 60° C, 80° C. and 100° C. each for 4 to 24 seconds and at 120° C. for 1.5 to 9 seconds.

In a third means, the visco-elastic characteristics of a non-magnetic layer coating solution and a magnetic layer coating solution are preferably adjusted to be compatible to the extent possible in the wet-on-wet coating method. A magnetic layer is provided while a non-magnetic layer still remains in a wet condition. Accordingly, the visco-elastic characteristics thereof which differ from one another to a large extent disturb the solutions of the respective coating solutions at the layer interface to thereby vary the thickness of the magnetic layer to a large extent.

The following methods can be used as means for adjusting the visco-elastic characteristics.

Such methods include imparting a thixotropy to the respective coating solutions and adjusting the ratio $A10^4/A10$ (the shearing stress $A10^4$ at a shearing speed of $10^4$ sec$^{-1}$ to a shearing stress $A10$ at a shearing speed of $10$ sec$^{-1}$) to $3 \leq A10^4/A10 \leq 100$ (more preferably $30 \leq A10^4/A10 \leq 90$).

The selection of the following factors are useful for adjusting the visco-elastic characteristics.

Factors for adjusting the visco-elastic characteristics for a non-magnetic powder or ferromagnetic powder to be dispersed include, for example, (1) particle size (specific surface area and average primary particle size), (2) structure (oil absorption amount and particle form), (3) characteristics of the powder surface (pH, heating loss), and (4) cohesive force of a particle ($\sigma$).

Factors for adjusting the visco-elastic characteristics for a binder include, for example, (1) molecular weight and (2) kind of a functional group.

Factors for adjusting the visco-elastic characteristics for a solvent include, for example, (1) kind of solvent (polarity), (2) solubility of the binder in the solvent, (3) addition amount of the solvent, and (4) water content thereof.

The viscosity of the non-magnetic layer coating solution and the magnetic layer coating solution is appropriately 0.5 to 300 centipoise, preferably 3 to 200 centipoise as measured with a single cylinder type rotative viscometer. The viscosity difference between the nonmagnetic layer coating solution and the magnetic layer coating solution is appropriately 100 centipoise or less, preferably 50 centipoise or less.

Fourthly, the particle size of the raw material used for the respective coating solutions for the non-magnetic layer and a magnetic layer is preferably smaller than the dry thicknesses of the non-magnetic layer and the magnetic layer. Namely, for a magnetic layer comprising a ferromagnetic powder, carbon black particles, abrasive particles, and non-magnetic particles, the particle sizes thereof are preferably at least 0.5 µm or less. In case of the non-magnetic layer, the thickness thereof is not limited and therefore the layer thickness can be increased in accordance with the size of the particles used.

Fifthly, the sizes and configurations of various powders contained in the magnetic layer coating solution and/or non-magnetic layer coating solution can be regulated so that a mixed region is not dynamically formed at the interface between the magnetic layer and non-magnetic layer.

For example, where an acicular non-magnetic powder is used, a rigid coated layer is formed even in an undried condition if the particles thereof are lined up (e.g., long axes of particles are parallel to one another). Mixing at the interface of the non-magnetic and magnetic layers is restrained even if a ferromagnetic powder in the magnetic layer is rotated (magnetically oriented). Furthermore, where a flaky non-magnetic powder is used for the non-magnetic layer, the flakes are dispersed through the layer in the form of a tile, and mixing is restrained at the interface even if a ferromagnetic powder in the magnetic layer is rotated.

In the present invention, since the average thickness of the magnetic layer is 0.5 µm or less, an overwriting characteristic specific to digital recording can be improved to a large extent. The higher the track recording density, namely, the shorter the recording wavelength, the greater the effect of the thickness of the magnetic layer is. Particularly, where the recording wavelength is 1.4 µm or less, a magnetic layer thickness of 0.5 µm or less is needed. Thus, regulating the variation in thickness in the present invention in accordance with the above equations (a) to (c) is important for obtaining stability of the overwriting characteristic, in addition to decreasing the difference between the maximum value and minimum value of the reproduction output and increasing the average value of the reproduction output.

In the present invention, the above electromagnetic characteristics are improved. In addition, good adhesion between the non-magnetic layer and the magnetic layer is obtained by using the wet-on-wet coating method and good running durability is also obtained.

The non-magnetic layer in the magnetic recording disk of the present invention comprises a non-magnetic powder and a binder resin as main components. The examples of the non-magnetic powder include an inorganic powder and an organic powder components. The non-magnetic layer preferably contains at least an electroconductive powder as the non-magnetic powder. The electroconductive powder is effective for adjusting the visco-elastic characteristic of the coating solution and for controlling the surface electrical resistance of the magnetic layer surface, to thereby provide good running durability. The electroconductive powder is preferably carbon black.

The content of carbon black in the non-magnetic layer is preferably in the range of from 3 to 20% by weight, particularly 5 to 15% by weight based on the entire amount of non-magnetic powder contained in the non-magnetic layer. A content of less than 3% by weight does not sufficiently reduce the surface inherent resistance and a content of more than 20% by weight does not provide a sufficiently smooth surface of the magnetic layer even though the surface inherent (electric) resistance is effectively reduced.

The specific surface area (BET method) of the carbon black powder for the non-magnetic layer is preferably in the range of from 5 to 1,200 $m^2/g$, more preferably 50 to 1,000 $m^2/g$; the DBP oil absorption (amount) thereof is preferably from 10 to 1,500 ml/100 g, more preferably 20 to 600 ml/100 g; the average particle size thereof is preferably from 5 to 500 mμ, more preferably 10 to 300 mμ; the pH is preferably 2 to 10, more preferably 2.5 to 9.5; the water content is preferably 0.1 to 10 wt %, more preferably 0.3 to 3.0 wt %; and the tap density (measured under the condition of number of tapping: 150, and head: 30 mm using tap density measuring instrument manufactured by Seishin Enterprise Inc.) is preferably 0.1 to 1 g/ml, more preferably 0.12 to 0.80 g/ml.

Values falling within the above ranges reduce the addition amount of the carbon black in a magnetic layer, which allows the desired packing density of the ferromagnetic powder to be achieved.

The carbon black can be provided with a low surface electric resistance to form a structure, which allows the surface inherent electric resistance to be controlled to a lower level. The generation of dropouts in running is thereby reduced.

In the present invention, the surface inherent electric resistance is adjusted preferably to $5 \times 10^9$ Ω/sq or less, more preferably $5 \times 10^8$ Ω/sq or less. Furthermore, a smooth surface characteristic of the non-magnetic layer/magnetic layer can be obtained to reduce spacing loss with a recording/reproducing head, which allows for a high reproduction output. Furthermore, carbon black having a DBP oil absorption (amount) of 200 ml/100 g or more is preferred since it tends to form a structure resulting in a low surface electric resistance so that the generation of dropouts in running is particularly reduced. The DBP oil absorption of carbon black is determined in the following manner: dibutyl phthalate (DBP) is added gradually to a carbon black powder; the condition of the carbon black is observed while kneading; and the point at which the carbon black powder forms a lump from a scattered condition in disorder is determined. The addition amount (ml) of dibutyl phthalate at that point is given as the DBP oil absorption (amount).

Carbon black is not only effective for providing a magnetic recording disk with an electroconductivity to prevent electrification of the magnetic recording disk, but also is used as a material for controlling the physical strength of the magnetic layer and the non-magnetic layer. Carbon black serves to control the visco-elastic characteristic of a non-magnetic layer coating solution. Furthermore, carbon black is a very useful material having various functions such as control of the friction coefficient and provision of a light shielding characteristic. Accordingly, because of the same reasons as discussed above, carbon black can also be incorporated into the magnetic layer. In this case, carbon black, if used, is preferably contained in a proportion of 0.1 to 30% by weight based on the amount of the ferromagnetic powder contained in the magnetic layer.

In the present invention, carbon black manufactured by any known method can be used for the non-magnetic layer or magnetic layer. Useful examples of carbon blacks include, for example, furnace black for rubbers, thermal black for rubbers, acetylene black, channel black, and lamp black. Specific examples thereof include Black Rearls 2000, 1300, 1000, 900, 800, and 700, and Vulcan XC-72 (manufactured by Cabot Co., Ltd.); #80, #60, #55, #50, and #35 (manufactured by Asahi Carbon Co., Ltd.); #3950B, #2400, #2300, #900, #1000, #30, #40, and #10b (manufactured by Mitsubishi Chemical Corporation); Conductex SC, and Raven 150, 50, 40, and 15 (manufactured by Columbia Carbon Co., Ltd.); and Ketjen Black EC, Ketjen Black ECDJ-500, and Ketjen Black ECDJ-600 (manufactured by Lion Akzo Co., Ltd.).

The carbon black for use in the present invention may be subjected to surface treatment with a dispersant, graft treatment with a resin or graphite treatment of a part of a surface. Carbon black may be dispersed in advance in a binder before adding to a non-magnetic layer coating solution or a magnetic layer coating solution. These carbon blacks can be used singly or in combination thereof.

As discussed above, carbon black serves to prevent electrification in a magnetic layer, reduce the friction coefficient, provide a light shielding characteristic, and improve layer strength. These effects are manifest differently depending on the type of carbon black used. Accordingly, carbon black in the present invention can be added to a non-magnetic layer and a magnetic layer depending on the intended purpose by selecting, e.g., an appropriate particle size, oil absorption, electric conductivity, and pH, while changing the kind, amount and combination of the carbon blacks. For carbon blacks for use in the present invention, reference can be made, for example, to *Carbon Black Handbook* (edited by Carbon Black Association).

In the magnetic recording disk of the present invention, the ferromagnetic powder contained in the magnetic layer includes, for example, an iron oxide series ferro-magnetic powder, a ferromagnetic metal powder, or a ferro-magnetic hexagonal series powder. Among them, the ferromagnetic metal powder or ferromagnetic hexagonal series powder are preferred.

When the ferromagnetic powder is a ferromagnetic metal powder, the particles thereof preferably have a specific surface area ($S_{BET}$) of from 30 to 60 $m^2/g$ (particularly from 40 to 60 $m^2/g$), a crystallite size of from 100 to 300 Å (particularly from 100 to 250 Å) as measured by X-ray diffraction, and an axis ratio (a length in the long axis/a length in the short axis) of 5 or more (particularly 6 or more).

A specific surface area of the ferromagnetic metal powder that is too small cannot sufficiently provide high density recording, while a specific surface area that is too large prevents the magnetic powder from sufficiently dispersing so that a smooth magnetic layer surface is not formed (which also unfavorably makes it difficult to achieve high density recording).

The crystallite size can be determined from a distribution of a half band width in a diffraction spectrum of a (1, 1, 0) face and a (2, 2, 0) face.

When the ferromagnetic powder is a ferromagnetic hexagonal series ferrite powder, the particles thereof preferably have a specific surface area ($S_{BET}$) of 25 to 60 m²/g (particularly 40 to 50 m²/g), a tabular ratio (a tabular diameter/a tabular thickness) of 2 to 6 (particularly 2.5 to 5.5), and a tabular diameter of 0.02 to 1.0 μm (particularly 0.03 to 0.08 μm).

For the same reasons as in the case of a ferromagnetic metal powder, a particle size thereof which is either too large or too small makes it difficult to record in a high density.

A powder containing at least Fe is an example of the above ferromagnetic metal powder. Specifically, metal elements or alloys mainly composed of Fe, Fe—Co, Fe—Ni and Fe—Ni—Co can be contained in the ferromagnetic metal powder. In order to provide the magnetic recording disk of the present invention having a high density recording property, the particle size of the ferromagnetic powder is preferably small as described above while the saturation magnetization ($\sigma s$) of the powder is preferably at least 110 emu/g, and more preferably 120 emu/g or more. The coercive force of the ferromagnetic metal powder is preferably 800 Oe (oersted) or more, more preferably 900 Oe or more.

In order to further improve the characteristics, non-metallic elements such as B, C, Al, Si and P can be added to the ferromagnetic metal powder in some cases. Usually, an oxide layer is formed on a particle surface of the above metal powder for chemical stabilization.

For forming the oxide layer, a known gradual oxidization treatment can be used, namely, a method in which a metal powder is dipped in an organic solvent and then dried, a method in which a metal powder is dipped in an organic solvent and then a gas containing oxygen is blown in to form an oxide layer on the surface thereof, followed by drying, and a method in which the partial pressures of oxygen gas and an inert gas are controlled to form an oxide layer on a surface of the metal powder without using an organic solvent.

The ferromagnetic hexagonal series ferrite powder for use in the present invention is a ferromagnetic powder which is tabular and has an axis of easy magnetization in the direction vertical to the plate thereof. The ferromagnetic hexagonal series ferrite powder includes barium ferrite, strontium ferrite, lead ferrite, calcium ferrite, and the cobalt-substitution product thereof. Among them, preferred are the cobalt-substitution product of barium ferrite and cobalt-substitution product of strontium ferrite. Furthermore, the elements such as In, Zn, Ge, Nb and V may be added in order to improve the characteristics thereof, if desired.

In order to provide the magnetic recording disk of the present invention with a high density recording property, a small particle size of the hexagonal series ferrite powder is preferably employed as described above. The hexagonal series ferrite powder for use in the present invention exhibits magnetic characteristics including a saturation magnetization ($\sigma s$) of preferably at least 50 emu/g or more, more preferably 53 emu/g or more, and a coercive force of preferably 500 Oe or more, more preferably 600 Oe or more.

In the magnetic recording disk of the present invention, it is preferred that the output in a circumferential direction is not varied. Accordingly, the orientation degree ratio is raised to the extent possible and the orientation degree ratio is preferably 0.85 or more. In order to raise the orientation degree ratio to 0.85 or more, a random orientation method can be used in which a permanent magnet field is applied while the magnetic layer remains in a wet condition, as described in JP-B-3-41895, or a method in which an alternate current magnetic field is applied, as described in JP-A-63-148417, 1-300427 and 1-300428.

In the present invention, the use of a ferromagnetic metal powder and a hexagonal series ferrite powder can provide an orientation degree ratio as high as 0.9 or more, wherein the orientation degree ratio is defined as the value obtained by dividing the minimum squareness ratio in a circumferential direction with the maximum squareness ratio.

The magnetic characteristics such as the saturation magnetization and the coercive force were measured in a maximum loaded magnetic field of 5 kOe with a vibrating sample magnetometer ("VSM-III" manufactured by Toei Kogyo Co., Ltd.). The specific surface area was measured by the BET method in which a quantarsorb (manufactured by Quantarchrom Co., Ltd., U.S.A.) is used. A value thereof was measured by a BET one point method (partial pressure: 0.30) after dehydrating at 250° C. for 30 minutes in a nitrogen atmosphere.

The water content of the ferromagnetic powder for use in the present invention is preferably 0.01 to 2% by weight. The water content is preferably optimized depending on the kind of binder resin employed. The pH value of the ferromagnetic powder also is preferably optimized depending on the type of binder resin used in combination therewith. The pH range thereof is 4 to 12, preferably 5 to 10.

The ferromagnetic powder may be subjected to surface treatment with Al, Si, P or the oxides thereof. An amount thereof is 0.1 to 10% based on the amount of the ferromagnetic powder. Subjecting the ferromagnetic powder to surface treatment is preferred since it reduces adsorption thereto of a lubricant such as a fatty acid to an amount of 100 mg/m² or less. The ferromagnetic powder contains a soluble inorganic ion such as Na, Ca, Fe, Ni, and Sr in some cases, but an amount of 500 ppm or less does not particularly influence the characteristics thereof.

An iron oxide ferromagnetic powder may be used as the ferromagnetic powder, if desired. The specific surface area thereof is preferably 25 to 80 m²/g, more preferably 35 to 60 m²/g as measured by the BET method. A value of less than 25 m²/g increases noise and a value of greater than 80 m²/g is not preferred since good surface properties are difficult to obtain. The crystallite size measured by X-ray diffraction is preferably 450 to 100 Å, more preferably 350 to 100 Å. $\sigma s$ is preferably 50 emu/g or more, more preferably 70 emu/g or more.

The ferromagnetic powder of the present invention may be subjected in advance to treatment with a dispersant, a lubricant, a surface active agent, and an anti-electrification agent (described below) before dispersing in a coating solution as described, for example, in JP-B-44-14090.

Examples of the non-magnetic powder for use in the non-magnetic layer of the present invention include a non-magnetic inorganic powder, for example, metal, metal oxide, metal carbonate, metal sulfate, metal nitride, metal carbide, and metal sulfide. More specific examples thereof, used singly or in combination, include $TiO_2$ (rutile and anatase), $TiO_x$ (x is less than 2 or 3 to 5), cerium oxide, tin oxide, tungsten oxide, ZnO, $Zr_2$, $SiO_2$, $Cr_2O_3$, α-alumina having an α-conversion rate of 90% or more, β-alumina, γ-alumina, α-iron oxide, geothite, corundum, silicon nitride, titanium carbide, magnesium oxide, boron nitride, molybdenum disulfide, copper oxide, $MgCO_3$, $CaCO_3$, $BaCO_3$, $SrCO_3$, $BaCO_4$, $CaCO_4$, and silicon carbide. They may be used alone or in combination. The forms and sizes of these inorganic powders are not particularly limited and can be acicular, spherical and cubic. Different inorganic powders can be combined if needed and also in case of a single inorganic powder, a particle size thereof can be optionally selected. The particle size is preferably from 0.01 to 2 μm.

The non-magnetic powder preferably has a tap density of from 0.3 to 2 g/ml, a water content of from 0.1 to 5%, a pH of from 2 to 11, and a specific surface area of from 1 to 30 m$^2$/g. The oil absorption thereof measured using DBP is from 5 to 100 ml/100 g, preferably 10 to 80 ml/100 g, and more preferably 20 to 60 ml/100 g. The above inorganic powders are not necessarily 100% pure and may be subjected to surface treatment with the other compounds, for example, compounds of Al, Si, Ti, Zr, Sn, Sb, and Zn to form the oxides thereof on the surface of the non-magnetic particles. In this case, a purity of 70% or more will not reduce the effectiveness of the non-magnetic powder. The ignition loss is preferably 20% or less.

Specific examples of the non-magnetic powder for use in the present invention include AKP-20, AKP-30 and AKP-50 (manufactured by Sumitomo Chemical Co., Ltd.), G5, G7 and S-1 (manufactured by Nippon Chemical Industrial Co., Ltd.), TF-100, TF-120 and TF-140 (manufactured by Toda Kogyo Co., Ltd.), TTO-55 series and ET-300W (manufactured by Ishiwara Sangyo Kaisha Ltd.), and STT-30 (manufactured by Titan Kogyo K.K.).

Examples of the non-magnetic organic powder for use in the present invention include an acryl styrene series resin powder, a benzoguanamine resin powder, a melamine Series resin powder, and a phthalocyanine series pigment. Other examples thereof include a polyolefin series resin powder, a polyester series resin powder, a polyamide series resin powder, a polyimide series resin powder, and a polyfluorinated ethylene resin powder. The organic non-magnetic powder can be prepared according to the methods described in JP-A-62-18564 and JP-A-60-255827.

A conventional thermoplastic resin, a thermosetting resin, a reactive type resin and mixtures thereof can be used as the binder for the magnetic layer and the non-magnetic layer of the present invention.

A preferred thermal resin has a glass transition point of −100° to 150° C., a number average molecular weight of 1,000 to 200,000, preferably 10,000 to 100,000, and a polymerization degree of about 50 to 1,000. Examples thereof include a polymer or copolymer containing vinyl chloride, vinyl acetate, vinyl alcohol, maleic acid, acrylic acid, acrylic acid ester, vinylidene chloride, acrylonitrile, metacrylic acid, metacrylic acid ester, styrene, butadiene, ethylene, vinyl butyral, vinyl acetal, and vinyl ether as a constitutional unit, a polyurethane resin, and various rubber series resins.

Examples of the thermosetting resin or reactive type resin include a phenol resin, an epoxy resin, a polyurethane setting type resin, a urea resin, a melamine resin, an alkyd resin, an acryl series reactive resin, a formaldehyde resin, a silicon resin, an epoxide-polyamide resin, a mixture of a polyester resin and an isocyanate prepolymer, a mixture of polyesterpolyol and polyisocyanate, and a mixture of polyurethane and polyisocyanate.

These resins are described in detail in *Plastic Handbook* published by Asakura Shoten. A known electron beam setting type resin may also be used for the non-magnetic layer or the magnetic layer. Examples and a manufacturing method for preparation thereof are described in detail in JP-A- 62-256219. The above resins can be used singly or in combination. Preferred resins include the combination of at least one resin selected from the group consisting of a vinyl chloride resin, a vinyl chloride-vinyl acetate resin, a vinyl chloride-vinyl acetate-vinyl alcohol resin, a vinyl chloride-vinyl acetate-maleic anhydride copolymer, and nitrocellulose, and a polyurethane resin, or a resin prepared by combining polyisocyanate therewith.

The constitution of the polyurethane resin includes a known polyester polyurethane, polyether polyurethane, polyether polyester polyurethane, polycarbonate polyurethane, polyester polycarbonate polyurethane, and polycaprolactone polyurethane. Preferred resins contain at least one or more polar groups selected from COOM, SO$_3$M, OSO$_3$M, P=O(OM)$_2$, O—P=O(OM)$_2$ (wherein M is a hydrogen atom or an alkali metal such as K, Li and Na), OH, NR$_2$, N$^+$R$_3$, (wherein R is a hydrocarbon group), an epoxy group, SH, and CN introduced into the resin by a copolymerization or addition reaction as needed in order to obtain excellent dispersibility and durability for the binders described above. An amount of the polar group is from $10^{-1}$ to $10^{-8}$ mole/g, preferably $10^{-2}$ to $10^{-6}$ mole/g of the resin.

Specific examples of these binders include VAGH, VYHH, VMCH, VAGF, VAGD, VROH, VYES, VYNC, VMCC, XYHL, XYSG, PKHH, PKHJ, PKHC, and PKFC (manufactured by Union Carbide Co., Ltd.); MPR-TA, MPR-TA5, MPR-TAL, MPR-TSN, MPR-TMF, MPR-TS, MPR-TM, and MPR-TAO (manufactured by Nissin Chemical Ind. Co., Ltd.); 1000W, DX80, DX81, DX82, DX83, and 100FD (manufactured by Electro Chemical Industry Co., Ltd.); MR105, MR110, MR100, and 400X110A (manufactured by Nippon Zeon Co., Ltd.); Nipporan N2301, N2302, and N2304 (manufactured by Nippon Polyurethane Co., Ltd.); Pandex T-5105, T-R3080, and T-5201, Burnock D-400 and D-210-80, and Crisvon 6109 and 7209 (manufactured by Dainippon Ink and Chemical Ind.); Byron UR8200, UR8300, UR8600, UR5500, UR4300, RV530, and RV280 (manufactured by Toyobo Co., Ltd.); Daipheramine 4020, 5020, 5100, 5300, 9020, 9022, and 7020 (manufactured by Dainichi Seika Co., Ltd); MX 5004 (manufactured by Mitsubishi Chemicals Corporation); Sunprene SP-150 (manufactured by Sanyo Chemical Industries Co., Ltd.); and Saran F310 and F210 (manufactured by Asahi Chemical Industry Co., Ltd.).

A binder for the magnetic layer and the non-magnetic layer of the present invention is contained in the range of preferably from 5 to 50% by weight, more preferably 10 to 30% by weight based on the amounts of the ferromagnetic powder and the non-magnetic powder, respectively. When a vinyl chloride series resin is used, the amount thereof is from 5 to 100% by weight, and when a polyurethane resin is used, the amount thereof is from 2 to 50% by weight, and further polyisocyanate is used in an amount of from 2 to 100% by weight, based on the amounts of the ferromagnetic powder and the non-magnetic powder, respectively.

Where a polyurethane resin is used in the present invention, the polyurethane resin preferably has a glass transition point of from −50° to 100° C., a break elongation of from 100 to 2000%, a break stress of from 0.05 to 10 kg/cm$^2$, and a yielding point of from 0.05 to 10 kg/cm$^2$.

The magnetic recording disk of the present invention comprises at least a magnetic layer provided on a non-magnetic layer. The magnetic recording disk may comprise plural non-magnetic layers and/or plural magnetic layers coated on the non-magnetic layer(s), wherein the compositions of the coating solutions for the respective layers may be either the same or different and the kinds and sizes of the powders can be diversely selected. The above methods may be applied as a method for coating the respective layer coating solutions by a wet-on-wet coating method.

Thus, it is possible to change the binder amount, the amounts of a vinyl chloride resin, a polyurethane resin, polyisocyanate and the other resins each contained in the binder, the molecular weights and polar group amounts of the respective resins constituting the magnetic layer, and the physical properties of the resins described above in the respective layer coating solutions as needed, as long as the effects of the invention are maintained.

The polyisocyanate for use in the present invention includes isocyanates such as tolylenediisocyanate, 4,4'-diphenylmethanediisocyanate, hexamethylenediisocyanate, xylylenediisocyanate, naphthylene-1,5-diisocyanate, o-tolu-idinediisocyanate, isophoronediisocyanate, and triphenyl-methanetriisocyanate, reaction products of these isocyanates and polyalcohols, and polyisocyanates prepared by condensing isocyanates. Useful commercially available isocyanates include Coronate L, Coronate HL, Coronate 2030, Coronate 2031, Millionate MR, and Millionate MTL (manufactured by Nippon Polyurethane Co., Ltd.); Takenate D-102, Takenate D-110N, Takenate D-200, and Takanate D-202 (manufactured by Takeda Chemical Industries Co., Ltd.); and Desmodur L, Desmodur IL, Desmodur N, and Desmodur HL (manufactured by Sumitomo Bayer Co., Ltd.). These isocyanates can be used for the respective layers singly or in combination of two or more utilizing the differences in hardening reactivity.

The abrasive for use in the present invention includes known materials having a Moh's hardness of 5 or more, such as α-alumina having an α-conversion rate of 90% or more, β-alumina, silicon carbide, chromium oxide, cerium oxide, α-iron oxide, corundum, artificial corundum, emery (main components: corundum and magnetite), artificial diamond, silicon nitride, silicon carbide, titanium carbide, titanium oxide, silicon dioxide, and boron nitride. The abrasives can be used singly or in combination thereof. Composites of these abrasives may also be used, are prepared by subjecting the abrasives to surface treatment with other abrasives. These abrasives contain compounds or elements other than the main components in certain occasions, but the effects thereof is kept without change if the content of the main component of the abrasive is 90 wt % or more.

The average particle size of these abrasives is preferably from 0.05 to 2 µm, more preferably 0.2 to 1.0 µmm. Particularly when added to the magnetic layer, the average particle size is preferably at least 0.5 µm. If desired, abrasives having different paricle sizes can be used in combination or a single abrasive can have the similar effect by broadening the paricle size distribution thereof. These abrasives have preferably a tap density of from 0.3 to 2 g/ml, a water content of 0.1 to 5%, a pH of 2 to 11, and a specific surface area of 1 to 30 $m^2/g$. The form of the abrasives used in the present invention may be any one of a needle, sphere and cube (dice shape).

The abrasive is added in the range of from 3 to 20 parts by weight per 100 parts by weight of the non-magnetic powder contained in the non-magnetic layer or the magnetic powder contained in the magnetic layer.

An addition amount of less than 3 parts by weight does not provide sufficient durability, while an addition amount of more than 20 parts by weight decreases the packing degree, and sufficient output is not obtained.

These abrasives can be used as appropriate by changing the combinations thereof according to the amounts and kinds of the non-magnetic powders contained in the non-magnetic layer and the amounts and kinds of the magnetic powders contained in an upper magnetic layer and a lower magnetic layer so that the intended purpose can be achieved. For example, where durability of the magnetic layer surface is to be improved, the amount of abrasive contained in the non-magnetic layer is increased, and where durability of an edge surface of the magnetic layer is to be improved, the amount of abrasive contained in the magnetic layer is increased. These abrasives may be added to a magnetic coating solution and a non-magnetic coating solution after having been subjected in advance to dispersion treatment with a binder. The abrasives contained in the magnetic layer surface and magnetic layer edge surface of the magnetic recording disk of the present invention are preferably contained in an amount of 5 particles/100 $\mu m^2$ or more.

Specific examples of the abrasives for use in the present invention include AKP-20, AKP-30, AKP-50, and HIT-50 (manufactured by Sumitomo Chemical Co., Ltd.); G5, G7, and S-1 (manufactured by Nippon Chemical Industrial Co., Ltd.); and TF-100, TF-140, 100ED, and 140ED (manufactured by Toda Kogyo Co., Ltd.).

Dispersants (a wetting agent for a pigment) for use in the present invention include fatty acids having from 12 to 18 carbon atoms ($R_1COOH$, in which $R_1$ is an alkyl group or alkenyl group having 11 to 17 carbon atoms), such as caplyric acid, capric acid, lauric acid, myristic acid, palmitic acid, stearic acid, behenic acid, oleic acid, elaidic acid, linoleic acid, linolenic acid, and stearolic acid; metal soaps consisting of alkali metal (Li, Na and K) salts and alkali earth metal (Mg, Ca and Ba) salts of the above fatty acids; fluorine-containing compounds of above fatty acid esters; amides of above fatty acids; polyalkylene oxide alkylphosphoric acid ester; lecithin; and trialkyl polyolefinoxy quaternary ammonium salts (the alkyl group having 1 to 5 carbon atoms and the olefin is ethylene, propylene or others). In addition to the above, useful dispersants include higher alcohols having 12 or more carbon atoms, and sulfuric acid esters thereof. These dispersants are used in the range of from 0.5 to 20 parts by weight per 100 parts by weight of binder resin.

Useful examples of lubricants include silicon oils such as dialkyl polysiloxane (the alkyl group having 1 to 5 carbon atoms), dialkoxy polysiloxane (the alkoxy group having 1 to 4 carbon atoms), monoalkyl monoalkoxy polysiloxane (the alkyl group having 1 to 5 carbon atoms and the alkoxy group having 1 to 4 carbon atoms), phenyl polysiloxane, and fluoroalkyl polysiloxane (the alkyl group having 1 to 5 carbon atoms); an electroconductive fine powder such as graphite; an inorganic powder such as molybdenum disulfide and tungsten disulfide; a plastic fine powder such as polyethylene, polypropylene, a polyethylene-vinyl chloride copolymer, and polytetrafluoroethylene; an α-olefin polymer; an unsaturated aliphatic hydrocarbon which is a liquid at ordinary (room) temperature (e.g., a compound in which a double bond of an n-olefin is bonded to a carbon atom at a terminal, about 20 carbon atoms); fatty acid esters prepared from monobasic fatty acid having 12 to 20 carbon atoms and monohydric alcohols having 3 to 12 carbon atoms; and fluorocarbons.

Among them, fatty acid esters are most preferred.

Examples of the alcohol used as a starting material of the fatty acid ester include momoalcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether, and sec-butyl alcohol; and polyhydric alcohols such as ethylene glycol, diethylene glycol, neopentyl glycol, glycerine, and a sorbitan derivative.

Examples of the fatty acid include an aliphatic carboxylic acid or a mixture thereof such as acetic acid, propionic acid, octanoic acid, 2-ethylhexanoic acid, lauric acid, myristic acid, stearic acid, palmitic acid, behenic acid, arachic acid, oleic acid, linoleic acid, linolenic acid, elaidic acid, and palmitoleic acid.

More specific examples of the fatty acid ester include the various ester compounds such as butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, butoxyethyl stearate, 2-butoxy-1-propyl stearate, a compound prepared by acylating dipropylene glycol monobutyl ether with stearic acid, diethylene glycol dipalmitate, a compound prepared by acylating hexamethylene diol with myristic acid to convert to a diester, and glycerine oleate.

Furthermore, in order to reduce hydrolysis of the fatty acid ester which occurs when a magnetic recording disk is used under conditions of high humidity, there can be selected fatty acid of a raw material, and an isomeric constitution such as branch/linear and cis/trans and a branched position of alcohol.

The following compounds can further be used as a lubricant: that is, silicon oil, graphite, molybdenum disulfide, boron nitride, fluorinated graphite, fluorinated alcohol, polyolefin, polyglycol, alkyl phosphoric acid ester, and tungsten disulfide.

These lubricants are added in the range of from 0.2 to 20 parts by weight per 100 parts by weight of the non-magnetic powder contained in the non-magnetic layer or the magnetic powder contained in the magnetic layer.

The kinds and amounts of these lubricants of the present invention can be used as needed in the magnetic layer and the non-magnetic layer. For example, fatty acids having the different melting points can be added to the respective layers to control bleeding to the surface, esters having different boiling points and polarities can be added to control bleeding to the surface and the addition amount of a lubricant can be increased in a non-magnetic layer to improve the lubrication effect. The present invention is not to be construed as being limited to the above examples.

All or a part of the additives for use in the present invention may be added at any step of preparing a magnetic coating solution, for example, the additives may be mixed with a ferromagnetic powder prior to a kneading step, the additives may be added at a kneading step of the ferromagnetic powder and a binder in a solvent, the additives may be added at a dispersing step, the additives may be added after dispersing, or the additives may be added immediately before coating.

Examples of commercially available lubricants for use in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor oil-hardened fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate, and erucic acid (manufactured by Nippon Oil & Fat Co., Ltd.); oleic acid (manufactured by Kanto chemical Co., Ltd.); FAL-205 and FAL-123 (manufactured by Takemoto Yushi Co., Ltd.); Enujerubu LO, Enujerubu IPM, and Sansosyzer E4030 (manufactured by Shin Nihon Rika Co., Ltd.); TA-3, KF-96, KF-96L, KF-96H, KF410, KF420, KF965KF54, KF50, KF56, KF907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 (manufactured by Shin-Etsu Chemical Co., Ltd.); Armide P, Armide C, and Armoslip CP (manufactured by Lion Ahmer Co., Ltd.); Dumion TDO (manufactured by Lion Oil & Fat Co., Ltd.); BA-41G (manufactured by Nisshin Oil Mills Co. Ltd.); and Profan 2012E, Newpol PE61, Ionet MS-400, Ionet MO-200, Ionet DL-200, Ionet DS-300, Ionet DS-1000, and Ionet DO-200 (manufactured by Sanyo Chemicals Co., Ltd.).

The non-magnetic support for use in the present invention is preferably a flexible and balance type support. Known films can be used including polyesters such as polyethylene terephthalate and polyethylene naphthalate, polyolefins, cellulose triacetate, polycarbonate, polyamide, polyimide, polyamidimide, polysulfone, polyether sulfon, aramide, aromatic polyamide, and syndiotactic polystyrene. In general, polyethylene terephthalate is preferred. The thickness of the non-magnetic support depends on the Young's modulus thereof and in general is preferably from 10 to 100 μm, more preferably 30 to 80 μmm, and most preferably 50 to 75 μmm for a high density recording magnetic disk. These supports may be subjected in advance to corona discharge treatment, plasma treatment, an adhesion promoting treatment, heat treatment and a dust-preventing treatment. In order to better achieve the effects of the present invention, a non-magnetic support is preferably used having a centerline average surface roughness (Ra) (cut-off value: 0.25 mm) of preferably 0.03 μm or less, more preferably 0.02 μm or less, and most preferably 0.01 μm or less. The preferred non-magnetic support in addition to a small centerline average surface roughness also has no coarse protrusions of 1 μm or more. The surface roughness can be controlled to the desired level by adjusting the size and amount of filler added to the support as needed. Useful fillers include an acrylic type organic fine powder in addition to oxides and carbonates of Ca, Si and Ti.

The non-magnetic support for use in the present invention has preferably an F-5 (i.e., the load at the 5% elongation) value of 5 to 50 kg/mm$^2$ in the web running direction (longitudinal direction) and an F-5 value of 3 to 30 kg/mm$^2$ in a web width direction. In general, the F-5 value in the web length direction is higher than that in the web width direction, but the F-5 value is not particularly limited, especially when strength in the width direction is to be increased.

The thickness constitution of the magnetic recording disk of the present invention comprises preferably 30 to 80 μm for a non-magnetic support, 0.5 to 10 μm for the non-magnetic layer and 0.5 μm or less (particularly 0.01 to 0.5 μm) for the magnetic layer. An undercoating layer may be provided between the non-magnetic support and non-magnetic layer in order to improve adhesion. The thickness of the undercoating layer is preferably 0.01 to 2 μm, more preferably 0.05 to 0.5 μm. Furthermore, a back coating layer may be provided on the side of the non-magnetic support opposite to that having the magnetic layer. The thickness of the back coating layer is preferably 0.1 to 2 μm, more preferably 0.3 to 1.0 μm. A conventional undercoating layer and back coating layer may be used in the present invention. The magnetic recording disk of the present invention can have a magnetic layer on both sides or either side thereof. A layer containing a resin and/or a lubricant may be provided on the surface of the magnetic layer as a protective layer.

The heat shrinkage rate of the non-magnetic support in the web running and width directions at 100° C. for 30 minutes is preferably 3% or less, more preferably 1.5% or less. The heat shrinkage rate at 80° C. for 30 minutes is preferably 1% or less, more preferably 0.5% or less. The breaking strength is preferably 5 to 100 kg/mm² in both directions and the elastic modulus is preferably 100 to 2,000 kg/mm².

The process for preparing the magnetic layer coating solution and the non-magnetic layer coating solution for the magnetic recording disk consists of at least a kneading step, a dispersing step and a mixing step provided before or after these steps as needed. Each of the steps may be divided into two or more stages. At an initial or middle stage of any step, all raw materials may be added such as a ferromagnetic power, a non-magnetic powder, a binder, carbon black, an abrasive, an anti-electrification agent, a lubricant, and a solvent for use in the present invention. The respective raw materials may be divided and added at two or more steps. For example, polyurethane may be divided and added at a kneading step, a dispersing step and a mixing step for adjusting the viscosity after dispersing.

Various mixing equipment can be used for mixing and dispersing the respective coating solutions including, for example, a two roll mill, a three roll mill, a ball mill, a pebble mill, a Trommel mill, a sand grinder, a Szegvari attriter, a high speed impeller disperser, a high speed stone mill, a high speed impact mill, a disper, a kneader, a high speed mixer, a homogenizer, and an ultrasonic disperser.

In order to achieve the object of the present invention, known techniques may be used as a part of the steps for preparing the magnetic recording disk of the present invention. A kneader having a strong kneading power, such as a continuous kneader and a pressurized kneader can be used at a kneading step to prepare the magnetic recording disk of the present invention having a high residual magnetic flux density (Br). Where a continuous kneader or pressurized kneader is used, the ferromagnetic powder and all (i.e., the amount of 15 to 500 parts by weight per 100 parts of the ferromagnetic powder) or a part of a binder (provided that 30% by weight or more of the all binder is preferred) can be kneaded together. The details of these kneading treatments are described in JP-A-1-106338 and JP-A-64-79274. Where a non-magnetic coating solution is prepared, a high specific gravity dispersing medium is preferably used and zirconia beads and metal beads are suitable.

In the present invention, a simultaneous coating method can be used as described in JP-A-62-212933 for efficient production.

The non-magnetic layer and magnetic layer provided on a non-magnetic support by the wet-on-wet coating method is preferably subjected to a calendering treatment following orientation treatment and a drying step. The roll for use in the calendering treatment includes a plastic roll having a heat resistance such as an epoxy resin, polyimide, polyamide, and polyimideamide. The treatment can be carried out with a metal roll. The treatment temperature is preferably 70° C. or more, more preferably 80° C. or more. The line pressure is preferably 200 kg/cm or more, more preferably 300 kg/cm or more.

The elastic modulus for an elongation of 0.5% in the magnetic layer is preferably 100 to 2,000 kg/mm² in either the running direction or the width direction; the breaking strength is preferably 1 to 30 kg/cm²; the elastic modulus of the magnetic recording disk is preferably 100 to 1,500 kg/mm² in either the running direction or the width direction; the residual elongation is preferably 0.5% or less; the heat shrinkage at a temperature of 100° C. or less is preferably 1% or less, more preferably 0.5% or less, and most preferably 0.1% or less.

The residual solvent contained in the magnetic layer is preferably 100 mg/m² or less, more preferably 10 mg/m² or less, and the residual solvent contained in the magnetic layer is preferably less than that contained in the non-magnetic layer.

The percentage of voids present in both of the magnetic layer and the non-magnetic layer is preferably 30% by volume or less, more preferably 10% by volume or less. The percentage of voids in the non-magnetic layer is preferably larger than that in the magnetic layer. If the percentage of voids in the non-magnetic layer is 5% or more, the percent of voids in the non-magnetic layer may be smaller than that in the magnetic layer.

The magnetic recording disk comprises plural layers, and the physical properties of the respective layers can be changed according to the intended purpose. For example, the elastic modulus of a non-magnetic layer can be increased to a value greater than that of the magnetic layer to improve contact of a magnetic head against the magnetic recording disk, and the elastic moduli of both of the non-magnetic layer and the magnetic layer may be increased to improve running durability.

The magnetic layer coated on a support by the wet-on-wet coating method may be subjected to orientation treatment of the ferromagnetic powder contained therein as needed, and then the magnetic layer thus formed is dried. Furthermore, the magnetic layer may be subjected to surface smoothing processing as needed and the recording medium is cut into a desired shape, to thereby prepare a magnetic recording disk.

The magnetic recording disk of the present invention provides for high density magnetic recording. Particularly, the electromagnetic characteristics such as an overwriting characteristic and reproduction output essential for a digital data recording medium remain stable and are not deteriorated even for high density recording where the shortest recording wavelength is 1.5 μm or less. In addition, the running durability advantageously is not deteriorated as well.

Furthermore, for the case where not only the recording wavelength is shifted to a shorter wavelength but also where the track density is increased, the magnetic recording disk of the present invention provides for recording having a decreased signal stroke and excellent separation of the peak shift. Because of this, even when recording at the shortest recording wavelength under conditions of a recording track width of 50 μm or less and a track density of 14 tracks/mm or more, the magnetic disk of the present invention enables recording/reproduction having an excellent overwriting characteristic and good running durability.

EXAMPLES

The present invention is described below in further detail with reference to the following Examples. It can be readily understood by one of ordinary skill in the art that the components, ratios, procedures, and others can be changed as long as they do not deviate from the scope of the present invention.

Accordingly, the present invention should not be construed as being limited to the following Examples. In the Examples, a "part" means a "part by weight".

Example 1

A non-magnetic layer coating solution and a magnetic layer coating solution were prepared by the following procedure.

Non-magnetic layer coating solution:

| | |
|---|---|
| Non-magnetic inorganic powder | 80 parts |
| Granular TiO$_2$ (TY 50 manufactured by | |
| Ishiwara Sangyo Kaisha, Ltd.) | |
| Average particle size: 0.34 μm | |
| Specific surface area by the BET method: 5.9 m$^2$/g | |
| pH: 5.9 | |
| Carbon black | 20 parts |
| Average particle size: 16 mμ | |
| DBP oil absorption: 80 ml/100 g | |
| pH: 8.0 | |
| Specific surface area by the BET method: 250 m$^2$/g | |
| Volatile component: 1.5% by weight | |
| Vinyl chloride-vinyl acetate-vinyl alcohol copolymer | 14 parts |
| —N(CH$_3$)$_3$$^+$CL$^-$group: 5 × 10$^{-6}$ eq/g | |
| Component ratio (by mol): 86:13:1 | |
| Polymerization degree: 400 | |
| Polyester polyurethane resin | 5 parts |
| Neopentyl glycol/caprolactone polyol/MDI: | |
| 0.9/2.6/1 (by mol) | |
| —SO$_3$Na group: 1 × 10$^{-4}$ eq/g | |
| sec-Butyl stearate | 4 parts |
| 2-Butoxy-1-ethyl stearate | 3 parts |
| Oleic acid | 1 part |
| Cyclohexanone | 400 parts |

Magnetic layer coating solution:

| | |
|---|---|
| Ferromagnetic metal fine powder | 100 parts |
| Composition: Fe/Ni = 96/4 (atom %) | |
| Hc: 1600 Oe | |
| Specific surface area by the BET method: 58 m$^2$/g | |
| Average crystallite size: 195 Å | |
| Average particle size (length in the long axis): | |
| 0.20 μm | |
| Acicular ratio: 10 | |
| Saturation magnetization (σs): 130 emu/g | |
| Vinyl chloride series copolymer | 14 parts |
| —SO$_3$Na group: 1 × 10$^{-4}$ eq/g | |
| Polymerization degree: 300 | |
| Polyester polyurethane resin | 3 parts |
| Neopentyl glycol/caprolactone polyol/MDI: | |
| 0.9/2.6/1 (by mol) | |
| —SO$_3$Na group: 1 × 10$^{-4}$ eq/g | |
| α-Alumina | 2 parts |
| (average particle size: 0.2 μm, max.: 0.42 μm) | |
| Carbon black | 0.5 part |
| (average particle size: 0.10 μm, max.: 0.25 μm) | |
| Isohexadecyl stearate | 6 parts |
| Oleic acid | 1 part |
| Methyl ethyl ketone | 300 parts |

In each of the above two coating solutions, the respective components were kneaded by a continuous kneader and then dispersed with a sand mill. Polyisocyanate (Coronate L) was added to the dispersions thus obtained, wherein 10 parts thereof were added to the non-magnetic layer coating solution and 12 parts thereof were added to the magnetic layer. Furthermore, butyl acetate (40 parts) was added to the respective solutions, followed by filtrating with a filter having an average pore size of 1 μm, to thereby prepare the non-magnetic layer coating solution and the magnetic layer coating solution, respectively. The viscosities of the two solutions were 150 centipoise for the non-magnetic layer coating solution and 185 centipoise for the magnetic layer coating solution (measured with a rotative visco-meter).

The non-magnetic layer coating solution thus obtained was applied on a polyethylene terephthalate support having a thickness of 62 μm and a center-average surface roughness of 0.01 μm. The magnetic layer was applied on the non-magnetic layer immediately thereafter, each layer being applied at a coating speed of 150 m/minute by a wet simultaneous coating method (i.e., a wet-on-wet coating method), so that dried thickness of the non-magnetic layer was 2 μm and that of the magnetic layer was 0.45 μm, respectively. While both layers were still in a wet condition, the support thus coated was passed through an alternating current magnetic field generating apparatus generating two magnetic fields at a frequency of 50 Hz and a magnetic field strength of 200 Gauss and at a frequency of 50 Hz and a magnetic field strength of 120 Gauss to subject the same to a random orientation treatment. After drying at 25° C., 40° C., 60° C., 80° C. and 100° C. each for 8 seconds and at 120° C. for 3 seconds, the recording medium was subjected to treatment with a calendering apparatus having seven stages at a temperature of 90° C. and a line pressure of 300 kg/cm and was then punched into a 3.5 inch size disk. Next, the disk was subjected to surface polishing treatment, then placed in a 3.5 inch cartridge provided on the inside thereof with a liner and a center core having a diameter of 29 mm (together with mounting other prescribed mechanism elements), to thereby obtain a 3.5 inch floppy disk.

Example 2

The magnetic layer coating solution in Example 1 was changed to the following composition to obtain a 3.5 inch floppy disk in the following manner.

Magnetic layer coating solution:

| | |
|---|---|
| Ferromagnetic hexagonal series | 100 parts |
| ferrite powder | |
| Hc: 1400 Oe | |
| Specific surface area by the BET method: 45 m$^2$/g | |
| Average particle size (tabular diameter): 0.06 μm | |
| Tabular ratio: 5.2 | |
| Saturation magnetization (σs): 65 emu/g | |
| Vinyl chloride series copolymer | 12 parts |
| —SO$_3$Na group: 1 × 10$^{-4}$ eq/g | |
| Polymerization degree: 300 | |
| Polyester polyurethane resin | 3 parts |
| Neopentyl glycol/caprolactone polyol/MDI | |
| (by mol): 0.9/2.6/1 | |
| —SO$_3$Na group: 1 × 10$^{-4}$ eq/g | |
| Carbon black | 0.5 part |
| Average particle size: 0.10 μm, max.: 0.25 μm | |
| α-Alumina | 10 parts |
| Average particle size: 0.2 μm, max.: 0.42 μm | |
| Specific surface area: 7.5 m$^2$/g | |
| Isohexadecyl stearate | 6 parts |
| Oleic acid | 2 parts |
| Methyl ethyl ketone | 400 parts |

The respective components of the non-magnetic layer coating solution in Example 1 and the above magnetic layer coating solution were kneaded with a continuous kneader and were was dispersed with a sand mill. To each of the dispersions thus obtained were added 10 parts of polyisocyanate (Coronate) for the non-magnetic layer and 9 parts for the magnetic layer, and butyl acetate (40 parts) was further added to the respective dispersions, followed by filtrating with a filter having an average pore of 1 μm, to thereby prepare the non-magnetic layer coating solution and the magnetic layer coating solution, respectively. The viscosity of the magnetic layer coating solution was 200 centipoise.

The non-magnetic layer coating solution thus obtained was applied on a polyethylene terephthalate support having a thickness of 62 μm and a center-average surface roughness of 0.01 μm. The magnetic layer was applied on the non-magnetic layer immediately thereafter, each layer being applied at a coating speed of 150 m/minute by a wet simultaneous coating method (i.e., a wet-on-wet coating method), so that the dried thickness of the non-magnetic layer was 2 μm and that of the magnetic layer was 0.45 μm.

While the both layers remained still in a wet condition, the support thus coated was passed between permanent magnets arranged so that a magnetic field was applied perpendicularly to the coated face at 3,000 Gauss to subject the same to a vertical orientation treatment. After drying at 25° C., 40° C., 60° C., 80° C. and 100° C. each for 8 seconds and at 120° C. for 3 seconds, the recording medium was subjected to treatment with a calendering apparatus having seven stages at a temperature of 90° C. and a line pressure of 300 kg/cm and was punched into a 3.5 inch size disk. Next, the disk was subjected to surface polishing treatment, then placed in a 3.5 inch cartridge provided on the inside thereof with a liner and a center core having a diameter of 29 mm (together with mounting other prescribed mechanism elements), to thereby obtain a 3.5 inch floppy disk.

Example 3

A 3.5 inch floppy disk was prepared in the same manner as Example 1, except that the amount of carbon black contained in the non-magnetic layer coating solution of Example 1 was changed from 20 parts to 5 parts, and the amount of cyclohexanone contained therein was changed from 400 parts to 350 parts.

Example 4

A 3.5 inch floppy disk was prepared in the same manner as Example 2, except that the amount of carbon black contained in the non-magnetic layer coating solution of Example 1 was changed from 10 parts to 5 parts, and the amount of cyclohexanone contained therein was changed from 400 parts to 350 parts.

Comparative Example 1

A 3.5 inch floppy disk was prepared in the same manner as Example 1, except that the drying condition in Example 1 was changed to 100° C. for 40 seconds and 120° C. for 3 seconds.

Comparative Example 2

A 3.5 inch floppy disk was prepared in the same manner as Example 2, except that the drying condition in Example 2 was charged to 100° C. for 40 seconds and 120° C. for 3 seconds.

Comparative Example 3

A 3.5 inch floppy disk was prepared in the same manner as Example 1, except that the cyclohexanone contained in the non-magnetic layer coating solution in Example 1 was changed to the same amount of methyl ethyl ketone.

Comparative Example 4

A 3.5 inch floppy disk was prepared in the same manner as Example 2, except that the cyclohexanone contained in the non-magnetic layer coating solution in Example 2 was changed to the same amount of methyl ethyl ketone.

Comparative Example 5

A 3.5 inch floppy disk was prepared in the same manner as Example 1, except that the amount of cyclohexanone contained in the non-magnetic layer coating solution in Example 1 was changed from 400 parts to 750 parts, so that the viscosity of the coating solution was 10 centipoise.

Comparative Example 6

A 3.5 inch floppy disk was prepared in the same manner as Example 2, except that the amount of methyl ethyl ketone contained in the magnetic layer coating solution in Example 2 was changed from 400 parts to 750 parts, so that the viscosity of the coating solution was 25 centipoise.

Comparative Example 7

A 3.5 inch floppy disk was prepared in the same manner as Example 1, except that α-alumina (average particle size: 0.2 μm, maximum: 0.42 μm) in an amount of 2 parts contained in the magnetic layer coating solution was replaced with α-alumina (average particle size: 0.4 μm, maximum: 0.9 μm) in an amount of 2 parts.

Comparative Example 8

A 3.5 inch floppy disk was prepared in the same manner as Example 1, except that the composition of the non-magnetic layer in Example 3 was used and the drying condition in Comparative Example 1 was applied.

Comparative Example 9

A 3.5 inch floppy disk was prepared in the same manner as Example 1, except that the average thickness of the magnetic layer in Example 1 was changed to 0.9 μm.

Comparative Example 10

A 3.5 inch floppy disk was prepared in the same manner as Example 2, except that the average thickness of the magnetic layer in Example 2 was changed to 0.9 μm.

The respective samples of the floppy disks thus obtained were evaluated as follows:

1. Orientation Degree Ratio:

A magnetic field of Hm 10 KOe was applied using a vibrating sample magnetometer ("VSM-III" manufactured by Toei Kogyo Co., Ltd.) to rotate a sample from 0 to 360 degrees by 10 degree increments in the magnetic field to obtain a squareness ratio, and the orientation degree was calculated and obtained by dividing the minimum value of the squareness ratio by the maximum value thereof.

2. Measurement of Reproduction Output:

A sample was subjected to recording with a disk test apparatus ("Model SK 606B" manufactured by Tokyo Engineering Co., Ltd.) with a metal-in-gap head having a gap length of 0.45 μm at a recording frequency of 625 kHz at the position of a radius of 24.6 mm. The reproduction output in a head amplifier was then measured with an oscilloscope ("Model 7633 manufactured by Sony Techtronics Co., Ltd.). An average value, a maximum value and a minimum value were calculated by the measurement method of JIS-X6221. The reproduction output values in Example 3, Comparative Example 1, Comparative Example 3, Comparative Example 5, Comparative Example 7, Comparative Example 8, and Comparative Example 9 were expressed relative to that of Example 1, which was set at 100. Similarly, the reproduction output values in Example 4, Comparative Example 2, Comparative Example 4, Comparative Example 6, and Comparative Example 10 were expressed relative to that of Example 2, which was set at 100.

3. Overwrite:

One cycle was divided into 72 sections using a spectrum analyzer ("Model TR 4171" provided with a gate option as a test apparatus) to thereby provide the respective windows for measurement of the reproduction signal spectra at each of positions obtained by dividing a measuring track on the medium corresponding to the positions of these windows into 72. The sample subjected to an alternating current demagnetization was then used to record at a frequency of 312.5 kHz with this measuring apparatus at the position of 39.5 mm and an output 01-72 (dB) was measured from an output 01-1 (dB) of a 312.5 kHz component. Then, overwriting was immediately carried out at a frequency of 1 MHz and the output 01-72 (dB) was measured from an output 02-1 (dB) of the 312.5 kHz component at the respective windows, to obtain the overwritings 02-J-01-J (dB) (J: 1 to 72) at the respective positions. The maximum, minimum and average values of the overwritings at these 72 points were obtained. Generally, a value falling within the range of −30 dB is a practical range.

4. Surface Electric Resistance of the Magnetic Layer (Ω/sq):

This parameter was measured by the method described in JIS X6101.9.4 with a digital ultra insulation resistance tester ("TR-8611 A" manufactured by Takeda Riken Co., Ltd.).

5. Running Durability:

A sample was subjected to recording on all 240 tracks at a recording frequency of 625 kHz with a floppy disk drive ("Model FD 1331 " manufactured by Nippon Electric Co,. Ltd.). Then, the sample was subjected to a thermocycle flow test at the position of 37.25 mm, in which the thermocycle flow described in Table 1 below was taken as was one cycle. The running durability was evaluated by the generation of dropout after running a sample disk 12 million times in terms of a pass time under the above thermal condition.

6. Thickness of the Magnetic Layer:

Ten points were measured at the range from 21 to 40 mm on a radius of a 3.5 inch floppy disk sample to obtain an average thickness $T_0$, a maximum thickness $T_{max}$ and a minimum thickness $T_{min}$. Furthermore, the thickness fluctuations $\Delta T_{max}$ and $\Delta T_{min}$ were calculated from the above equations.

The viscosities of the non-magnetic layer coating solution and a magnetic layer coating solution were measured with a single cylinder rotation viscometer ("VH-H1" manufactured by Shibaura System Co., Ltd.) at the conditions of 23° C. and 50% RH.

TABLE 1

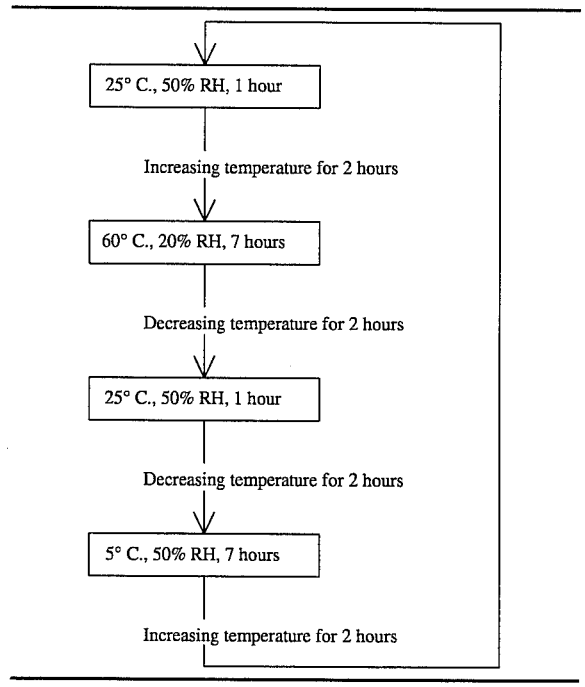

Thermocycle Flow

The evaluation results of the characteristic parameters of the Examples and Comparative Examples obtained by the above evaluation methods are shown in Table 2 below.

TABLE 2

| Sample | Thickness of magnetic layer (μm) | | | Thickness variation (%) | | Reproduction output (%) | | | *1 | *2 × $10^4$ | *3 | Overwrite (dB) | | |
|---|---|---|---|---|---|---|---|---|---|---|---|---|---|---|
| | $T_0$ | $T_{max}$ | $T_{min}$ | $\Delta T_{max}$ | $\Delta T_{min}$ | Avg. | Max. | Min. | Ω/sq | passes | | Avg. | Max.*4 | Min. |
| Example 1 | 0.45 | 0.48 | 0.42 | 6.7 | −6.7 | 100 | 106 | 93 | 2 × $10^7$ | 1200 OK | 0.99 | −30 | −29 | −32 |
| Example 2 | 0.44 | 0.49 | 0.41 | 11 | −6.8 | 100 | 110 | 94 | 3 × $10^7$ | 1200 OK | 0.99 | −31 | −28 | −32 |
| Example 3 | 0.43 | 0.47 | 0.40 | 9.3 | −4.7 | 97 | 106 | 93 | 3 × $10^{12}$ | 850 DO | 0.99 | −31 | −29 | −32 |
| Example 4 | 0.44 | 0.48 | 0.40 | 9.1 | −9.1 | 99 | 108 | 90 | 4 × $10^{12}$ | 720 DO | 0.99 | −31 | −28 | −33 |
| Comp. Ex. 1 | 0.45 | 0.54 | 0.36 | 20 | −20 | 98 | 115 | 79 | 8 × $10^8$ | 1200 OK | 0.98 | −30 | −26 | −34 |
| Comp. Ex. 2 | 0.44 | 0.55 | 0.34 | 25 | −23 | 95 | 116 | 73 | 9 × $10^8$ | 1200 OK | 0.99 | −31 | −25 | −36 |
| Comp. Ex. 3 | 0.43 | 0.60 | 0.30 | 40 | −30 | 95 | 130 | 65 | 7 × $10^7$ | 920 DO | 0.97 | −31 | −22 | −37 |
| Comp. Ex. 4 | 0.44 | 0.61 | 0.29 | 39 | −34 | 97 | 133 | 63 | 9 × $10^7$ | 980 DO | 0.98 | −31 | −21 | −38 |
| Comp. Ex. 5 | 0.41 | 0.62 | 0.20 | 51 | −51 | 92 | 136 | 40 | 4 × $10^7$ | 1200 OK | 0.97 | −32 | −21 | −42 |
| Comp. Ex. 6 | 0.39 | 0.62 | 0.18 | 59 | −54 | 88 | 125 | 35 | 8 × $10^7$ | 360 DO | 0.90 | −34 | −21 | −43 |
| Comp. Ex. 7 | 0.45 | 0.55 | 0.36 | 22 | −20 | 99 | 117 | 78 | 7 × $10^7$ | 1200 OK | 0.99 | −30 | −25 | −34 |
| Comp. Ex. 8 | 0.45 | 0.55 | 0.35 | 22 | −22 | 98 | 115 | 72 | 3 × $10^{12}$ | 550 DO | 0.98 | −30 | −25 | −34 |
| Comp. Ex. 9 | 0.91 | 1.07 | 0.78 | 18 | −14 | 162 | 183 | 118 | 4 × $10^9$ | 1200 OK | 0.96 | −11 | −5 | −12 |
| Comp. Ex. 10 | 0.89 | 1.06 | 0.75 | 19 | −16 | 145 | 104 | 104 | 5 × $10^9$ | 1200 OK | 0.98 | −10 | −6 | −20 |

DO: dropout generated
*1: surface electric resistance.
*2: running durability.
*3: orientation degree ratio.
*4: overwrite (max) for practical use: −27 dB or less In Examples 1 to 4 of the present invention, in which the average thickness of the magnetic layer is 0.5 μm or less and the thickness fluctuation represented by $\Delta T_{max}$ and $\Delta T_{min}$ falls within the range of 15%, stable reproduction output, overwriting characteristic and electromagnetic characteristic of the orientation degree ratio are obtained. In addition, the running durability is also excellent in Examples 1 and 2.

On the other hand, in any of Comparative Examples 1 to 8, in which the thickness fluctuation represented by $\Delta T_{max}$ and $\Delta T_{min}$ exceeds 15% while the average thickness of the magnetic layer is 0.5 μm or less, stability of the reproduction output and overwriting characteristic is inferior due to the large thickness fluctuation of the magnetic layer.

In Comparative Examples 1, 2 and 8, drying was carried out at a high temperature from the beginning of the drying step after wet-on-wet coating, without starting the drying step from room temperature unlike the examples of the present invention. Accordingly, the thickness fluctuation of the magnetic layer was large.

In Comparative Examples 3 and 4, the high boiling point solvent (cyclohexanone, boiling point: 156° C.) contained in the non-magnetic layer coating solution was changed to a low boiling point solvent (methyl ethyl ketone, boiling point: 156° C.). The thickness fluctuation of the magnetic layer was large as well.

In Comparative Examples 5 and 6, in which the viscosity differences between the non-magnetic layer coating solution and the magnetic layer coating solution were as large as −140 poise and −125 poise, respectively, the interface variation between the non-magnetic layer and the magnetic layer was large.

In Comparative Example 7, the size of the α-alumina contained in the magnetic layer composition was increased.

In Comparative Examples 9 and 10, the average thicknesses of the magnetic layer were increased to 0.91 μm and 0.89 μm, respectively. Consequently, the overwriting characteristics thereof were deteriorated.

The present invention provides a magnetic recording disk comprising a non-magnetic support, having thereon, in order, a non-magnetic layer containing a non-magnetic powder dispersed in a binder and a magnetic layer containing a magnetic powder dispersed in a binder. The magnetic layer is coated while the non-magnetic layer remains in a wet condition. The non-magnetic layer contains at least an electroconductive powder as the non-magnetic powder; the average thickness of the magnetic layer is 0.5 μm or less; and the maximum thickness and a minimum thickness of the magnetic layer falls within the range of ±15% of the average thickness. The above features provide a high durability medium having an excellent overwriting characteristic as well as a stable output.

While the invention has Seen described in detail and with reference to specific examples thereof, it will be apparent to one skilled in the art that various changes and modifications can be made therein without departing from the spirit and scope thereof.

What is claimed is:

1. A magnetic recording disk comprising a non-magnetic support having coated thereon, in the following order, a non-magnetic layer comprising mainly a non-magnetic powder and a binder resin and a magnetic layer comprising mainly a ferromagnetic powder and a binder resin, wherein the non-magnetic layer is formed by applying a non-magnetic coating solution containing a first solvent onto the non-magnetic support, the magnetic layer is formed by applying a magnetic layer coating solution containing a second solvent onto the coated non-magnetic layer while the non-magnetic layer remains in a wet condition, the first solvent for the non-magnetic coating solution has a boiling point higher than that of the second solvent for the magnetic layer is 0.01 to 0.5 μm, and the maximum thickness and the minimum thickness of the magnetic layer fall within the range of ±15% of the average thickness of the magnetic layer.

2. The magnetic recording disk as in claim 1, wherein at least a part of the non-magnetic powder is an electroconductive powder.

3. The magnetic recording disk as in claim 1, wherein the ferromagnetic powder is a ferromagnetic metal powder or a hexagonal series ferrite powder.

4. The magnetic recording disk as in claim 1, wherein the magnetic recording disk has a surface electric resistance of $5 \times 10^9$ Ω/sq or less.

5. The magnetic recording disk as in claim 1, wherein the first solvent has a boiling point of 90° C. or more, the second solvent has a boiling point 100° C. or less, and the difference in boiling point between the first solvent and the second solvent is 40° C. or more.

6. The magnetic recording disk as in claim 2, wherein the electroconductive powder is carbon black.

* * * * *